United States Patent [19]

Morris et al.

[11] Patent Number: 4,884,132
[45] Date of Patent: Nov. 28, 1989

[54] PERSONAL SECURITY SYSTEM

[76] Inventors: James A. Morris, P.O. Box 4002, Charlottesville, Va. 22903; Terry F. Morris, 1405 Chandler Rd., Huntsville, Ala. 35801; Frank O. Birdsall, Rte. 1, Box 16, Afton, Va. 22920

[21] Appl. No.: 291,342

[22] Filed: Dec. 28, 1988

Related U.S. Application Data

[63] Continuation of Ser. No. 934,836, Nov. 25, 1986, abandoned.

[51] Int. Cl.⁴ .............................................. H04N 7/18
[52] U.S. Cl. ...................................... 358/93; 358/108; 358/906; 455/33; 455/100
[58] Field of Search ................... 358/83, 93, 108, 228, 358/224, 161, 229, 211, 134, 213.23, 209, 906; 360/69; 455/33, 53–56, 100; 379/59, 60

[56] References Cited

U.S. PATENT DOCUMENTS

| | | | |
|---|---|---|---|
| 4,083,003 | 4/1978 | Haemming | 455/100 X |
| 4,097,893 | 6/1978 | Camras | 358/83 |
| 4,162,449 | 7/1979 | Bouyssounouse et al. | 455/100 X |
| 4,249,206 | 2/1981 | Roscoe | 358/108 X |
| 4,293,876 | 10/1981 | Williams | 358/108 X |
| 4,317,130 | 2/1982 | Brown | 358/108 |
| 4,492,978 | 1/1985 | Thomas | 358/134 |
| 4,511,886 | 4/1985 | Rodriguez | 358/108 X |
| 4,516,157 | 5/1985 | Campbell | 358/209 X |
| 4,574,319 | 3/1986 | Konishi | 358/209 X |
| 4,605,959 | 8/1986 | Colbaugh | 358/93 |
| 4,606,073 | 8/1986 | Moore | 455/100 X |
| 4,630,110 | 12/1986 | Cotton et al. | 358/108 |
| 4,644,351 | 2/1987 | Zabarsky et al. | 455/33 X |
| 4,651,143 | 3/1987 | Yamanaka | 358/108 X |

Primary Examiner—James J. Groody
Assistant Examiner—Victor R. Kostak
Attorney, Agent, or Firm—James C. Wray

[57] ABSTRACT

The personal security system transmits a picture of an object, such as a criminal suspect, and the identification of a portable transmitter, such as the social security number of the user, to a receiver at a remote location. Time of transmission is recorded. If a crime occurs, the time, picture of the suspect, and identification of the victim are obtained from a recorder at the receiver. A potential victim of a crime points his portable personal security unit at a criminal suspect and presses an activating switch. The unit senses available light on the object and provides a flash if required. At the same time focusing an aperture control is performed and an image of the object is admitted to an image recorder which is a focal plane sensor array. Image data from the focal plane sensor array is processed in an image data processor and the processed image data is fed to a cellular communication transmitter for transmitting to the remote receiving station. An audio pickup at the portable unit is connected to the receiver for transmitting voice communications over the transmitter. By pointing the device at a suspect and pressing a button, a person makes a permanent record of an image.

15 Claims, 1 Drawing Sheet

SURFACE IMAGE-TO-DIGITAL CONVERSION CHIP

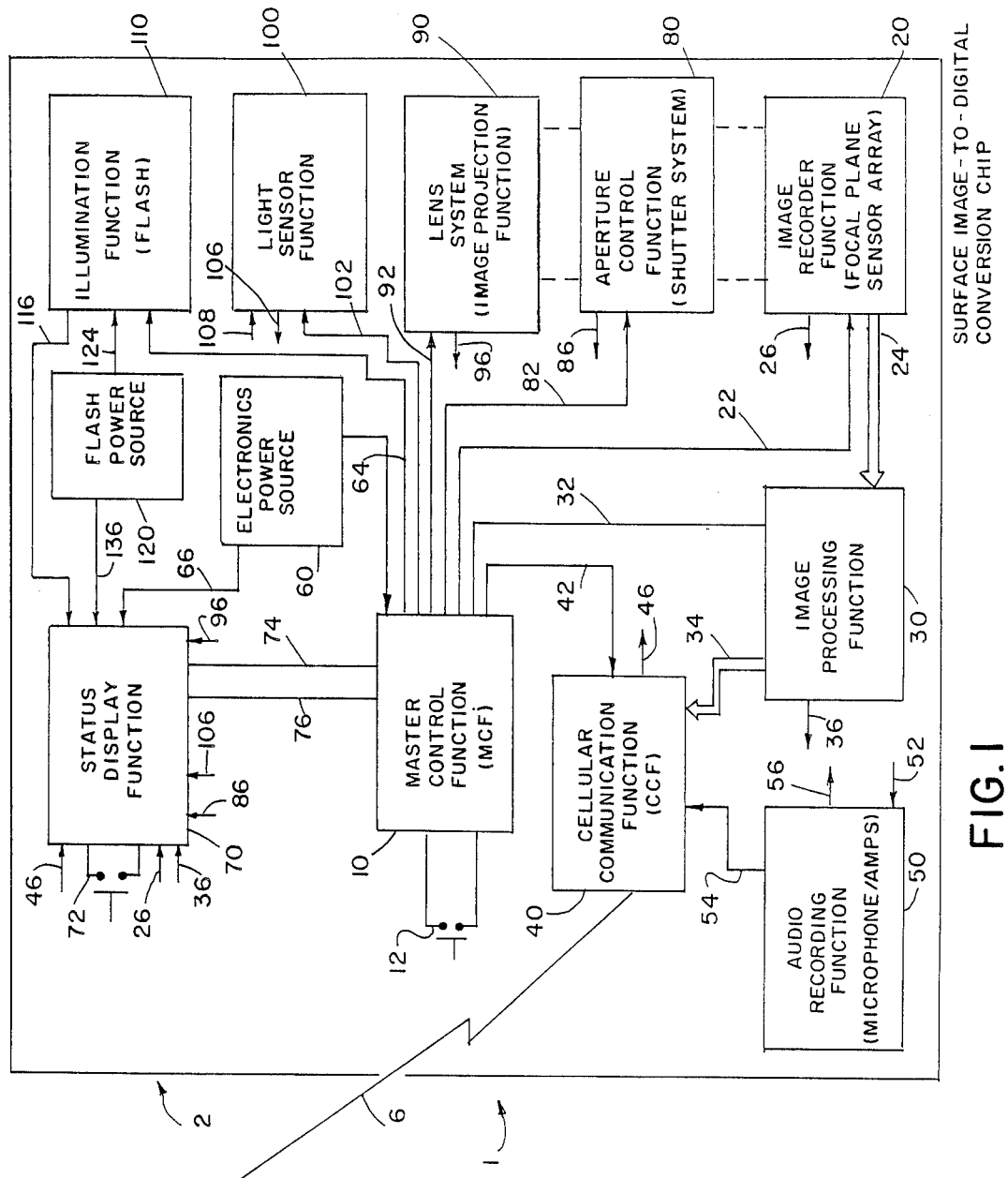
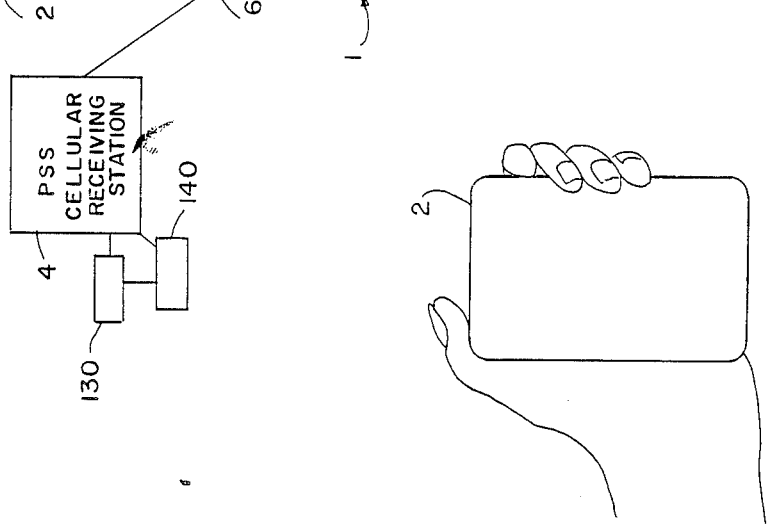
FIG. 1
FIG. 2

PERSONAL SECURITY SYSTEM

This application is a continuation of application Ser. No. 934,836 filed Nov. 25, 1986, now abandoned.

BACKGROUND OF THE INVENTION

Personal security systems are increasingly in demand. Passive systems which do not directly threaten a suspected potential assailant or place the victim at additional risk are needed. Particularly, passive systems are needed which would record information concerning the potential assailant or the location of a potential crime or victim at the time of the crime. Of particular need is a system which renders the records of the suspected potential criminal and place and time of a crime safe from destruction by a criminal. The present invention provides these needs.

SUMMARY OF THE INVENTION

The personal security system transmits a picture of an object, such as a criminal suspect, and the identification of a portable transmitter, such as the social security number of the user, to a receiver at a remote location. Time of transmission is recorded. If a crime occurs, the time, picture of the suspect, and identification of the victim are obtained from a recorder at the receiver. A potential victim of a crime points his portable personal security unit at a criminal suspect and presses an activating switch. The unit senses available light on the object and provides a flash if required. At the same time focusing an aperture control is performed and an image of the object is admitted to an image recorder which is a focal plane sensor array. Image data from the focal plane sensor array is processed in an image data processor and the processed image data is fed to a cellular communication transmitter for transmitting to the remote receiving station. An audio pickup at the portable unit is connected to the receiver for transmitting voice communications over the transmitter. By pointing the device at a suspect and pressing a button, a person makes a permanent record of an image.

A preferred personal security system has a hand-held unit having a digital image sensor and transmitter for transmitting a digital image and digital information to a remote location.

The preferred personal security system further has an aperture optically aligned with the sensor for permitting an image to pass through to the sensor.

Preferably, the hand-held unit includes a cellular transmitter and the image sensor is a surface image to digital signal conversion chip.

The preferred hand-held unit comprises a start button, a master control function unit connected to the start button, and an electronic power source, an illumination unit, a light sensor unit, a projection lens control unit, an aperture control unit, an image recording unit having a focal plane sensor array, an image processing unit connected to the image recording unit and a cellular communication unit. All of the units are connected to the master control unit and connected to the image processing unit for broadcasting signals from the image processing unit to a distant cellular receiving station.

The preferred personal security system further comprises an audio recording unit connected to the cellular communication unit for providing a digital audio signal to the cellular communication unit.

A status display unit is connected to the master control unit, the status display unit connected to the illumination unit, to the light sensor unit, to the lens unit, to the aperture control unit, and to the image recording unit for displaying status and function of those units. The status display unit is also connected to the image processing unit for displaying status of the image processing unit.

A preferred personal security system has a portable unit having a cellular communication transmitter and a remote unit having a cellular communication receiver. The portable unit further comprises an image recording unit for recording an image of a person or place. An image processing unit connected to the image recording unit converts signals from the image recording unit to signals transmittable by the cellular communication transmitter. A master control unit is connected to the image recording unit and the image processing unit and to the cellular communication transmitter for starting the recording unit and the processing unit and the transmitter.

The portable unit further comprises an aperture control unit mounted adjacent the image recording unit for permitting an image to fall upon the image recording unit.

The preferred portable unit further comprises an illumination source for illuminating an object for image recording and a light sensor unit for sensing illumination of the object of which an image is to be recorded. A power source is connected to the illumination unit and to the light sensor unit, to the aperture control unit and to the image recording unit and to the image processing unit and to the transmitter for providing power thereto.

A personal security system preferably includes the steps of transmitting an image of an object near a portable unit to a remote receiving station and preserving the image of the object and an identification of the portable transmitting unit and time at the receiving station.

The transmitting preferably comprises placing an image of the object upon an image receiving unit, converting an image of the object into electronic signals and transmitting electronic signals containing information signals of the image to the remote receiving station.

The image receiving preferably comprises recording an image on a focal plane sensor array and producing image data from the focal plane sensor array, processing the image data into processed image data signals and transmitting the processed image data signals.

The preferred personal security system further comprises steps of admitting an image of a nearby object to the focal plane sensor array and controlling admission of the image of the object to the focal plane sensor array and focusing the image of the object upon the focal plane sensor array.

An object near the portable unit is illuminated with a flash, and the image on the focal plane sensor array is recorded during the illumination of the object from which the image is formed.

Light level of the object is sensed by the personal security system.

The preferred sensing of the image comprises recording of the image and further comprising the steps of controlling an aperture to the image recorder and controlling a lens focusing system, sensing illumination of an object of which the image is to be recorded and flash illuminating the object upon sensing low light upon the object. Functional readiness is displayed for the image recording, the aperture controlling, the lens controlling, the light sensor, and the flash illumination steps upon pushing a status button. The light sensing, the flash illumination, the lens control, the aperture control, and the image recording function, the image processing function, and the transmitting function operate upon pushing a start button.

BRIEF DESCRIPTION OF THE DRAWINGS

FIG. 1 shows a personal security system with schematic showing of elements within a portable hand-held unit and its cellular communication link to a remote cellular receiving station.

FIG. 2 shows that portable hand-held unit 2 in a hand.

DETAILED DESCRIPTION OF THE DRAWINGS

A personal security system is generally indicated by the numeral 1. The system comprises a portable hand-held unit generally indicated by the numeral 2 and a remote cellular receiving station 4 which may be connected by a radio link 6. A master control function unit 10 in the portable unit has a start button 12. The master control function unit is connected to an image recording function unit 20 which is preferably a focal plane sensor array via control line 22. Output of the image recording unit 20 appears on the image data line 24. Line 26 connects the image recording unit to a status display function check. An image processing function unit 30 is connected to the image data line 24 and line 32 from the master control unit starts the image processing unit 30. The image processing unit is preprogrammed with the unit identification, such as the social security number of the owner, and converts the image data from line 24 in a processed digital image data signal on output line 34 which is supplied to the cellular communication function transmitter 40. Line 42 connects the transmitter to the master control unit to provide a start signal and power to the transmitter. An audio recording unit 50 which has a microphone and amplifier is connected to the transmitter 40 by output line 54 by which a digital audio signal is provided to the cellular communication transmitter 40. An input line 52 from the master control unit 10 supplies power and a start signal to the audio unit 50. Electronic power source 60 provides power over line 64 to the master control unit 10 which in turn supplies power to the other units. Line 66 is connected from the power source 60 to a status display 70.

An aperture control unit 80 receives power and start instruction from master control unit 10 over line 82. Line 86 provides status of the aperture control unit to the status display 70.

Lens system unit 90 supplies the image projection function. Power and start control to the lens system 90 are provided from the master control unit 10 over line 92. Line 96 provides a status signal to the status display unit 70. The light sensor unit 100 senses illumination on an object when a start signal is provided over line 102. A status signal of the light sensor is provided over line 106. Power is separately supplied to the light sensor unit from power line 108 from the power source 60.

The flash illumination unit 110 receives a start signal over line 112 from the master control unit 10. Line 116 provides a status check of the flash illumination unit 110 to the status display 70. A flash power source 120 supplies flash power over line 124 to the flash illumination unit 110. Status of the flash power unit is provided over line 126 to the status display unit 70.

Unit 70 has a status check switch 72 and has a status report line 74 and a status request line 76 to and from the master control unit 10. The cellular receiving station 4 has a clock 130 and recorder 140 to record all cellular communications received from all hand-held units 2. One cellular receiving station 4 may support several hand-held units 2.

Power source 60 supplies power to the master control function unit 10. Power also may be supplied from the power source 60 to capacitors in the flash power source 120. Power is also supplied over line 108 to the light sensor function unit 100.

When a status check button 72 is pushed, status report line 74 causes the master control function unit 10 to supply power as needed for checks to the image recorder 20, the image processor 30, the transmitter 40 and the audio system 50 through the power and start lines 22, 32, 42, and 52, respectively. Status signals are provided from those units over lines 26, 36, 46, and 56, respectively. During the status check the master control function unit 10 also energizes the aperture control function unit 80, the lens control system unit 90 and the light sensor function unit 100 over lines 82, 92, and 102, respectively. Status of those units is reported to the status display function unit over lines 86, 96, and 106, respectively. The master control function unit 10 status is reported over line 76 to the status display function. Concurrently line 116 checks the status of illumination function flash unit 110. The status display function unit 70 has go, no go LED lamps for each unit.

The master control function unit requires periodic status display function unit checks via line 76. Unit 70 includes a periodic beeper to indicate malfunction.

We claim:

1. A personal security system comprising a hand-held unit having a digital image sensor, wherein the image sensor comprises a surface image to digital signal conversion chip, a cellular transmitter for transmitting a digital image, a window, wherein the window is optically aligned with the sensor for permitting an image to pass through the window to the sensor, and digital preprogrammed information identifying the hand-held unit to a remote location.

2. The personal security system of claim 1 wherein the portable unit further comprises an aperture control unit mounted adjacent the image recording unit for permitting an image to fall upon a image recording unit.

3. The apparatus of claim 1 wherein the hand-held unit comprises a start button, a master control function unit connected to the start button, an electronic power source connected to the master control unit, an illumination unit connected to the master control unit, a light sensor unit connected to the master control unit, a projection lens control unit connected to the master control unit, an aperture control unit connected to the master control unit, an image recording unit having a focal plane sensor array connected to the master control unit, an image processing unit connected to the master control unit and connected to the image recording unit and a cellular communication unit connected to the master control unit and connected to the image processing unit for broadcasting signals from the image processing unit to a distant cellular receiving station.

4. The personal security system of claim 3 further comprising an audio recording unit connected to the cellular communication unit for providing a digital audio signal to the cellular communication unit.

5. The personal security system of claim 3 further comprising a status display unit connected to the master control unit, the status display unit connected to the illumination unit, to the light sensor unit, to the lens unit, to the aperture control unit, and to the image recording unit for displaying status and function of those units.

6. The apparatus of claim 5 wherein the status display unit is connected to the image processing unit for displaying status of the image processing unit.

7. A personal security system comprising a portable unit having a cellular communication transmitter and a remote unit having a cellular communication receiver, the portable unit further comprising an image recording unit for recording an image of a person or place and an image processing unit preprogrammed with an identification of the portable unit and connected to the image recording unit for converting signals from the image recording unit to signals transmittable by the cellular communication transmitter and the image processing unit being connected to the cellular communication transmitter, and a master control unit connected to the image recording unit and the image processing unit and to the cellular communication transmitter for starting the recording unit and the processing unit and the transmitter.

8. The personal security system of claim 7 wherein the portable unit further comprises an illumination source for illuminating an object for image recording and a light sensor unit for sensing illumination of the object of which an image is to be recorded and a power source connected to the illumination unit and to the light sensor unit, to the aperture control unit and to the image recording unit and to the image processing unit and to the transmitter for providing power thereto.

9. A personal security system comprising the steps of recording an image of an object near a portable hand-held unit, wherein the image is received by an image recording unit within the portable hand-held unit;
processing the image of the object into electronic signals, wherein the image is processed by an image processing unit within the portable hand-held unit, the image processing unit being preprogrammed with an electronic identification signal unique to the portable hand-held unit;
controlling an aperture to the image recorder;
controlling a lens focusing system, sensing illumination of an object of which the image is to be recorded and flash illuminating the object upon sensing low light upon the object;
transmitting the electronic signals containing information of the image and identification of the unit to a remote receiving station; and
preserving the electronic signal by the remote receiving station, wherein the remote receiving station records the time of day when the electronic signals are received.

10. The personal security system of claim 9 further comprising the steps of displaying functional readiness of the image recording, the aperture controlling, the lens controlling, the light sensor, and the flash illumination steps upon pushing a status button, and starting the light sensing, the flash illumination, the less control, the aperture control, and the image recording function, the image processing function, and the transmitting function upon pushing a start button.

11. The personal security system of a claim 9 wherein the recording comprises recording an image on a focal plane sensor array and producing image data from the focal plane sensor array.

12. The personal security system of claim 11 further comprising admitting an image of a nearby object to the focal plane sensor array and controlling admission of the image of the object to the focal plane sensor array.

13. The method of claim 12 further comprising focusing the image of the object upon the focal plane sensor array.

14. The method of claim 12 further comprising illuminating an object near the portable unit with a flash and recording the image on the focal plane sensor array during the illumination of the object from which the image is formed.

15. The personal security system of claim 14 further comprising sensing light upon the object near the personal security system.

* * * * *